(12) United States Patent
Nam et al.

(10) Patent No.: US 7,652,972 B2
(45) Date of Patent: Jan. 26, 2010

(54) NANO DATA WRITING AND READING APPARATUS USING CANTILEVER STRUCTURE AND FABRICATION METHOD THEREOF

(75) Inventors: Hyo-Jin Nam, Seoul (KR); Young-Sik Kim, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 11/183,870

(22) Filed: Jul. 19, 2005

(65) Prior Publication Data

US 2006/0018239 A1 Jan. 26, 2006

(30) Foreign Application Priority Data

Jul. 20, 2004 (KR) ...................... 10-2004-0056495

(51) Int. Cl.
*G11B 9/00* (2006.01)
*H05B 3/00* (2006.01)

(52) U.S. Cl. ......................... 369/126; 29/611
(58) Field of Classification Search ....................... None
See application file for complete search history.

(56) References Cited

U.S. PATENT DOCUMENTS

| | | |
|---|---|---|
| 5,475,318 A | 12/1995 | Marcus et al. |
| 5,883,387 A | 3/1999 | Matsuyama et al. |
| 5,929,438 A | 7/1999 | Suzuki et al. |
| 6,148,662 A | 11/2000 | Lin et al. |

(Continued)

FOREIGN PATENT DOCUMENTS

CN 1629958 A 6/2005

(Continued)

*Primary Examiner*—Joseph H Feild
*Assistant Examiner*—Christopher R Lamb
(74) *Attorney, Agent, or Firm*—Birch, Stewart, Kolasch & Birch, LLP

(57) ABSTRACT

A nano data writing and reading apparatus using a cantilever structure includes a cantilever formed by patterning a deposition material deposited on a sacrificial substrate, a probe formed at a front end portion of one surface of the cantilever and formed simultaneously with the cantilever as the deposition material is filled in a probe groove pattern formed on the sacrificial substrate when the deposition material is deposited on the sacrificial substrate, a heater formed of polycrystalline silicon at the cantilever, for heating the probe, a data sensing unit formed at the cantilever and sensing data written on media, a signal connection pad connected to the data sensing unit and formed at the cantilever to provide an electrical connection with an external signal line, a signal transfer circuit unit connected to the signal connection pad, for controlling writing and reading of data on and from the media, and a bonding unit allowing the cantilever to be supported at the signal transfer circuit unit and providing a passage for an electrical connection between the signal connection pad and the signal transfer circuit unit. Accordingly, the cantilever and the probe can be precisely formed by a molding technique through the removal of a sacrificial substrate and are formed of a deposition material such as a silicon nitride material, thereby remarkably reducing variations in a thickness of the cantilever and improving the durability of the probe. Also, because a bonding process with a glass wafer for fabricating the cantilever structure is not required, the process is facilitated and a fabrication coast is greatly reduced.

37 Claims, 23 Drawing Sheets

U.S. PATENT DOCUMENTS

| | | |
|---|---|---|
| 7,460,462 B2 * | 12/2008 | Mejia et al. .................. 369/126 |
| 2003/0179685 A1 * | 9/2003 | Nam .......................... 369/126 |
| 2004/0097002 A1 | 5/2004 | Pogge et al. |
| 2004/0119490 A1 | 6/2004 | Liu et al. |
| 2005/0051515 A1 | 3/2005 | Nam |
| 2005/0135224 A1 * | 6/2005 | Mejia et al. .................. 369/126 |

FOREIGN PATENT DOCUMENTS

| | | |
|---|---|---|
| EP | 0 785 410 A2 | 7/1997 |
| EP | 0 785 410 A3 | 7/1997 |
| EP | 0 860 726 A1 | 8/1998 |

* cited by examiner

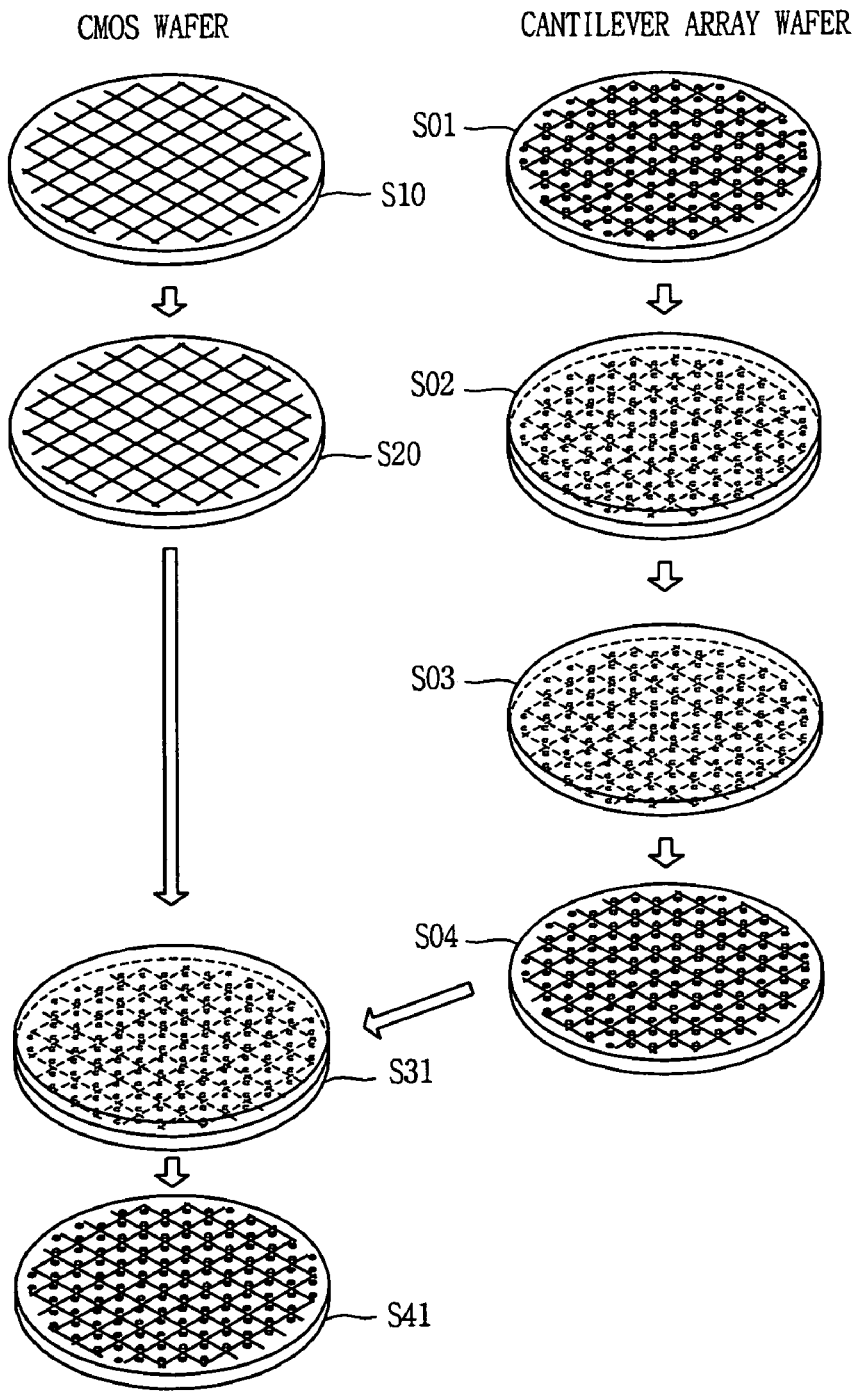

NANO DATA WRITING AND READING APPARATUS USING CANTILEVER STRUCTURE AND FABRICATION METHOD THEREOF

BACKGROUND OF THE INVENTION

1. Field of the Invention

The present invention relates to a nano data writing and reading apparatus using a cantilever structure and its fabrication method, and particularly, to a nano data writing/reading apparatus using a cantilever structure and its fabrication method configured to improve durability and performance of the cantilever structure and remarkably reduce a fabrication process.

2. Description of the Background Art

In general, an atomic force microscope is a device for measuring the topography of surfaces, using a cantilever structure, and a fine cantilever probe is formed at a front end portion of one side of a cantilever in the atomic force microscope. By using the cantilever probe, the surface topography and an electrical or magnetic characteristic of a sample can be identified with a nanometer scale resolution. The biggest advantage of such an atomic force microscope is its resolution that is high enough to directly measure an atomic structure by using a probe of several nanometers.

Recently, research is actively ongoing on a data writing and reading apparatus having a storage density of more than Tbit/$in^2$ by using the high resolution of the atomic force microscope. A device that writes data upon changing properties of a storage media by using the cantilever probe is called "a data writing apparatus using an SPM(Scanning Probe Microscopy) principle". As the method of changing the storage media by using the SPM principle, there are a method of mechanically changing the media by using heat, a method of changing a polarity of a ferroelectric such as a piezoelectric driver, a method of inducing a change in resistance by changing a phase with heat or electricity, using a phase transition material, and the like. Besides, a method using a ferromagnetic material or the like is used.

The representative one of the data writing and reading apparatuses using such various SPM principles is "Millipede" developed by IBM. It uses a polymer material (e.g., PMMA) as recording media by applying a principle of an atomic microscope, which is one of the SPM principles. The Millipede is configured such that a plurality of unit cantilevers (64×64) are disposed for the purpose of improving a speed. Such a unit cantilever includes a silicon probe, a heater and a silicon cantilever.

FIGS. 1A and 1B are sectional views of a unit cantilever of the conventional nano data writing and reading apparatus developed by IBM, namely, the Millipede, which shows an operation principle of writing and reading data on and from the media.

First, as shown in FIG. 1A, data is written on or read from the media including a silicon substrate 20 and a polymer part 21 by using a cantilever 10 having a heater 11 formed in contact with the probe 13.

FIG. 1B shows a method for writing data on the media. In the drawing, the writing is performed by forming a hole. The hole is formed such that the polymer part 21 of the media including the silicon substrate 20 and the polymer part 21 is melt by heating a heater 11 formed at an end portion of the cantilever 10.

A method of reading the data written on the media will now be described with reference to FIGS. 1B and 1C. First, when the data is read, the heater 11 is heated and then the reading is performed by using a difference between rates at which the heater 11 is cooled. When the probe 13 is inserted in a hole formed as shown in FIG. 1B, a distance (a) between the heater 11 and the media 20, 21 becomes short, and heat is diffused to the media 20, 21 through the probe, which makes a cooling rate of the heater 11 high. In contrast, when the probe 13 is placed on the surface of the media 20, 21 as shown in FIG. 1C, a distance (b) between the heater 11 and the media 20, 21 becomes long, which makes the cooling rate of the heater 11 low. In such a manner, it can be determined whether or not the hole exists, so that the data can be read.

Such a writing and reading method is called a thermo-mechanical method.

FIGS. 2A and 2B are views which specifically illustrate the method of writing data by using the cantilever employing the thermo-mechanical method. As shown in the drawings, a range of a region within which the data is stored is varied according to a thickness of a polymer of recording media. Namely, as shown in FIG. 2A, if a thick polycarbon 21a is used as media, a region ($d_{bit}$) for writing becomes large, thereby lowering a writing density. In contrast, as shown in FIG. 2B, if a thin PMMA 21b is used as the media, a region ($d_{bit}$) for the writing becomes small, thereby increasing the writing density. Accordingly, the PMMA 21b having a high density is commonly used as the media. Also, if the PMMA is used as the media, a time required for the writing is also reduced.

Because it takes a relatively long time to write and read the data by the thermo-mechanical method, a plurality of unit cantilevers are arranged and used as writing and reading head parts in order to improve a writing and reading rate. A method for fabricating a cantilever array head therefor is disclosed in a report issued by IBM in 2003 (Nanotechnology-based Approach to Data storage (RZ 3480, 2003, 08, 25), p. 1907~1910 of Transducer'03).

FIGS. 3 and 4A~4F illustrate a core part of the method of fabricating a cantilever array structure released by IBM in 2003. FIG. 3 is a conceptual view of a wafer-level fabrication method, and FIGS. 4A to 4F are sectional views of a unit cantilever, for illustrating sequential processes of the cantilever fabrication method.

FIG. 3 is a conceptual view which illustrates an entire process for forming a data writing and reading apparatus by bonding a signal transfer circuit unit wafer with a cantilever array wafer which are made by two separate processes.

First, fabricating a wafer where a signal transfer circuit unit is formed is constituting an electric circuit by using CMOS. Here, an electronic circuit part processing driving signals and data of a data writing and reading apparatus to be formed later is formed (S10), and a structure for bonding with a cantilever part which is separately formed is formed (S20).

As for the fabrication of a cantilever array wafer, a cantilever structure is formed on a seed wafer to be sacrificed (S01), a glass wafer is bonded with an entire upper surface of the cantilever structure (S02), the cantilever structure is transferred onto the glass wafer by removing the seed wafer (S03), and the glass wafer is flipped over and a structure for the bonding with the wafer having the signal transfer circuit unit is formed (S04).

When the fabrication of the signal transfer circuit unit wafer and the cantilever array wafer is completed, the bonding structures formed at both the wafers, respectively, are made to face each other, and then, the two wafers are bonded by heat and pressure applied thereto (S31). Then, the glass wafer which has supported the cantilever structure is removed (S41). Namely, the cantilever structure is transferred to the signal transfer circuit unit wafer.

In the aforedescribed process, the process of bonding the seed wafer with the glass wafer is required in the cantilever array wafer process, and the process of bonding the signal transfer circuit unit wafer with the cantilever array wafer is also required. Namely, a process difficult to perform such as an alignment process between the structures should be performed twice, which causes problems in that it requires a long time to perform the process, a yield is reduced and a cost is increased.

FIGS. 4A to 4F are views which illustrate the aforedescribed process in the aspect of a unit cantilever in more detail.

In FIGS. 4A to 4C, a cantilever array structure 32 is formed, using a silicon wafer 30 on which an insulation film 31 has been formed (i.e., an SOI wafer (Silicon On Insulator)), and a glass wafer 34 having a coefficient of thermal expansion similar to that of silicon is bonded with the SOI wafer having the cantilever array structure 32 by using a polyimide layer 33 (FIG. 4A). Then, the silicon substrate 30 and the insulation layer 31 are removed from the SOI wafer (FIG. 4B).

A bonding structure 35 including a bonding pad and a bonding bump are formed on the exposed cantilever array structure 32 so as to be bonded with a wafer 40 having a signal transfer circuit unit for controlling the cantilever array structure 32 and transferring a signal. Such a bonding structure may be formed as two layers of polyimide such that a standard polyimide layer is formed and an adhesive polyimide layer is further formed thereon (FIG. 4C), thereby preparing for a bonding process with the signal transfer circuit unit wafer 40 to be performed thereafter.

FIG. 4D is a view which illustrates a structure of the signal transfer circuit unit wafer 40 formed by a separate process. On the signal transfer circuit unit wafer 40, an electric circuit unit for signal transfer is formed, and a bonding structure 41 for electric coupling between the electric circuit unit and the cantilever structure is formed. The bonding structure 41 is a metal stud formed including a part for bonding and a part for electrical connection.

FIGS. 4E and 4F show a process in which the two wafers having passed through aforementioned processes are bonded together. First, the two wafers are aligned such that the bonding structure 41 formed on the signal transfer circuit unit wafer 40 is inserted between the bonding structures 41 formed on a lower portion of the cantilever array structure 32. Then, bonding is performed thereon under proper temperature and pressure (FIG. 4E). Also, the glass wafer 34 and the polyimide layer 33 which have supported the cantilever array structure 32 are removed (FIG. 4F).

However, in the nano data writing and reading apparatus using the conventional cantilever structure and its fabrication method, because the cantilever structure and the probe are formed by etching a part of a silicon device layer of the SOI wafer, variations in a thickness of the initial silicon device layer and in an etching rate occur, which makes it difficult to maintain a constant thickness of the cantilever structure. Also, because the probe formed of silicon is badly abraded from use, it is difficult to maintain reliability.

Also, in the conventional method for fabricating the cantilever structure, the process of bonding the glass wafer with the SOI wafer where the cantilever structure is arranged, and the process of bonding the wafer having the signal transfer circuit unit with the patterned SOI wafer should be performed. Such bonding processes greatly affect an entire yield of a product. Namely, because such a bonding process of a wafer level should be performed twice in the conventional method, an entire process becomes complicated, a yield of a final product is reduced, and a cost is increased.

If an SOI wafer having epi-silicon is used, variations in the thickness of the cantilever can be reduced, but problems of a large increase in cost and abrasion of a probe still remain.

SUMMARY OF THE INVENTION

Therefore, an object of the present invention is to provide a nano data writing and reading apparatus using a cantilever structure and its fabrication method configured to improve durability and performance of a cantilever structure and remarkably reduce a fabrication process.

To achieve these and other advantages and in accordance with the purpose of the present invention, as embodied and broadly described herein, there is provided a nano data writing and reading apparatus using a cantilever structure, the apparatus comprising: a cantilever formed by patterning a deposition material deposited on a sacrificial substrate; a probe formed at a front end portion of one surface of the cantilever and formed simultaneously with the cantilever as the deposition material is filled in a probe groove pattern formed on the sacrificial substrate when the deposition material is deposited on the sacrificial substrate; a heater formed of polycrystalline silicon at the cantilever, for heating the probe; a data sensing unit formed at the cantilever and sensing data written on media; a signal connection pad connected to the data sensing unit and formed at the cantilever to provide an electrical connection with an external signal line; a signal transfer circuit unit connected to the signal connection pad, for controlling writing and reading of data on and from the media; and a bonding unit allowing the cantilever to be supported at the signal transfer circuit unit and providing a passage for an electrical connection between the signal connection pad and the signal transfer circuit unit.

To achieve these and other advantages and in accordance with the purpose of the present invention, as embodied and broadly described herein, there is provided a fabrication method of a nano data writing and reading apparatus using a cantilever structure, the method comprising: a first step of forming a probe groove at a principle surface of a silicon substrate; a second step of forming a silicon nitride film at the principle surface of the silicon substrate, for forming a cantilever and a probe; a third step of forming a heater at a rear surface of the probe, patterning the cantilever on the silicon nitride film, and forming a signal connection pad electrically connected to the heater on the cantilever and a data sensing unit connected to the signal connection pad and sensing data; a fourth step of bonding a substrate provided with the signal transfer circuit unit with the silicon substrate provided with the cantilever, for supporting the cantilever and electrically connecting the signal transfer circuit unit with the signal connection pad; and a fifth step of removing the silicon substrate, for exposing the cantilever and the probe.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings:

FIG. 3 is a schematic conceptual view which illustrates processes of a fabrication method of the nano data writing and reading apparatus using the conventional cantilever structure;

DETAILED DESCRIPTION OF THE PREFERRED EMBODIMENTS

Reference will now be made in detail to the preferred embodiments of the present invention, examples of which are illustrated in the accompanying drawings.

A plurality of embodiments of a nano data writing and reading apparatus using a cantilever structure in accordance with the present invention may exists, and the most preferred embodiment will now be described.

Figure 1:
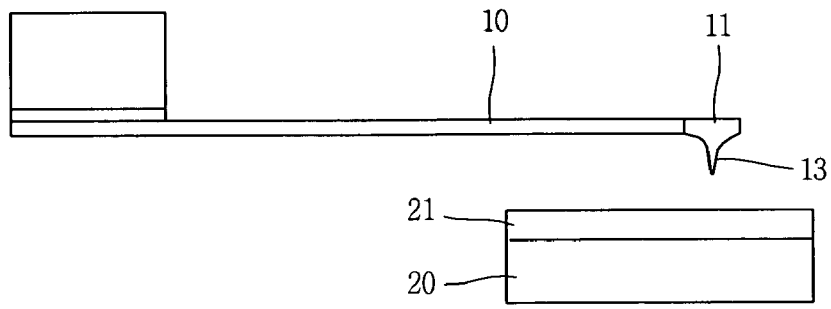
FIGS. 1A and 1C are conceptual views which illustrate an operation principle of a nano data writing and reading apparatus using the conventional cantilever structure.
Figure 1B:
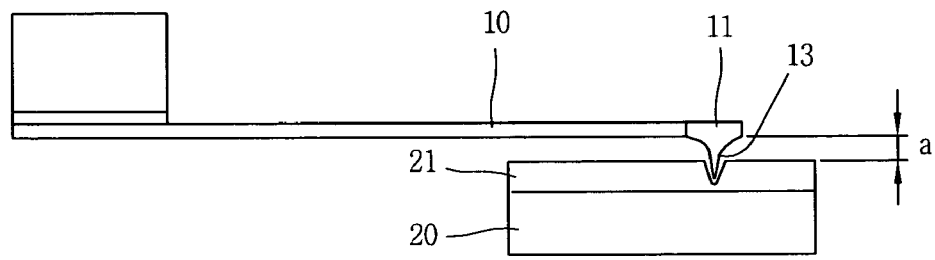
Figure 1C:
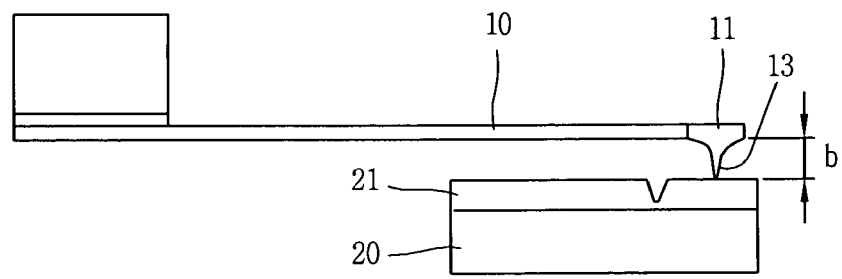
Figure 2A:
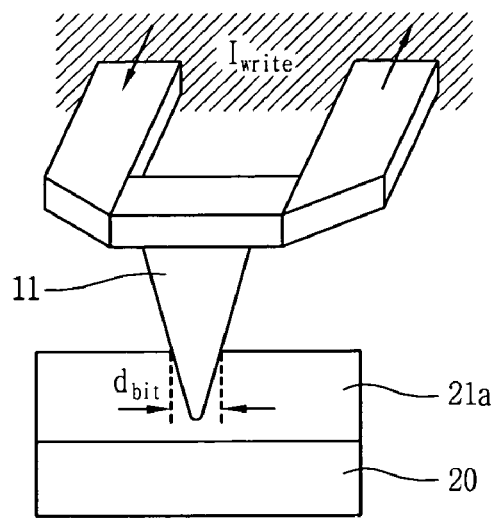
FIGS. 2A and 2B are conceptual views of a media recording principle of the nano data writing and reading apparatus using the conventional cantilever structure.
Figure 2B:
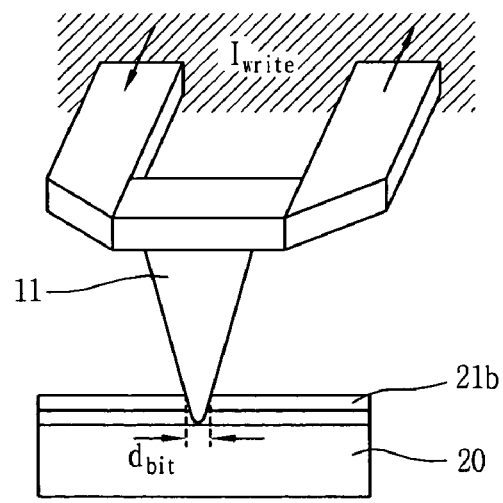
Figure 4A:
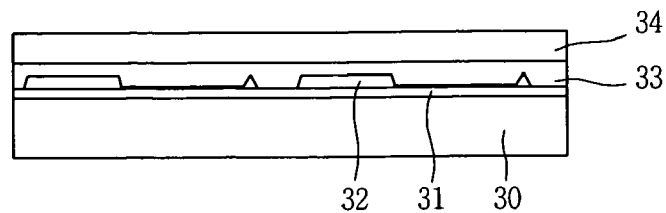
FIGS. 4A to 4F are sectional views of processes of the fabrication method of the nano data writing and reading apparatus using the conventional cantilever structure.
Figure 4B:
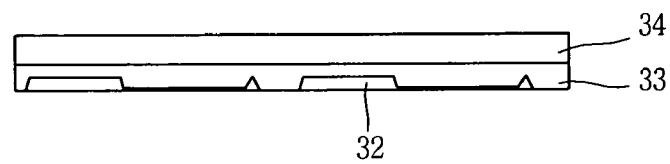
Figure 4C:
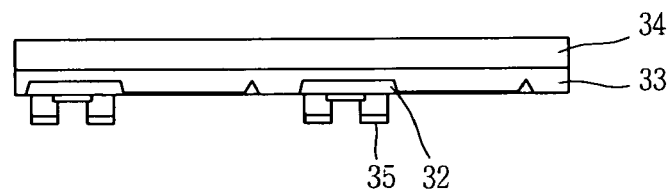
Figure 4D:
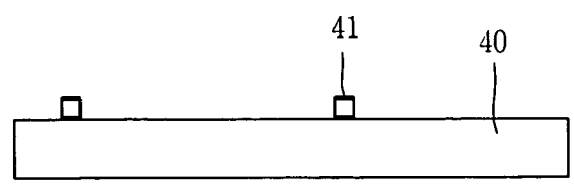
Figure 4E:
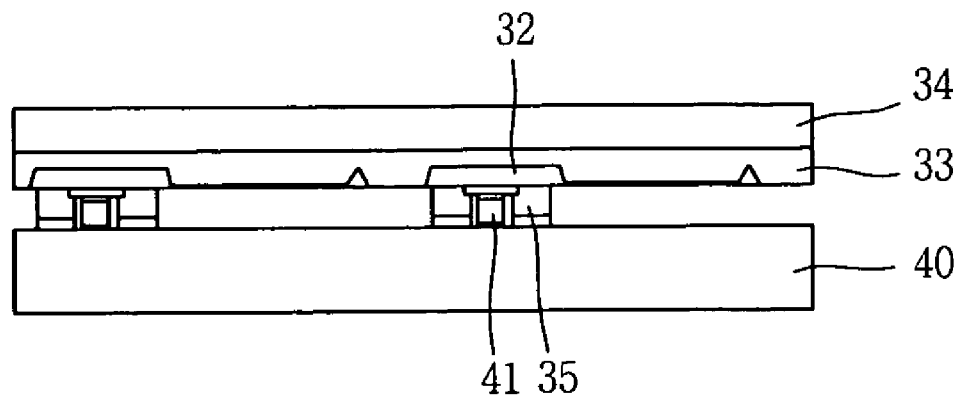
Figure 4F:
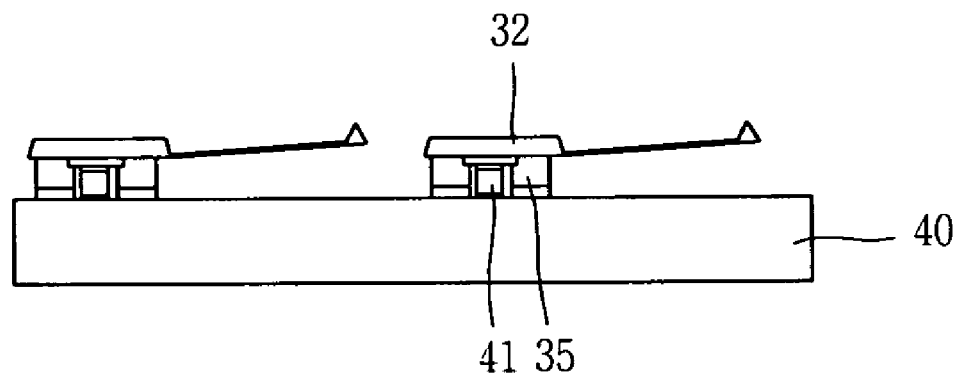
Figure 5A:
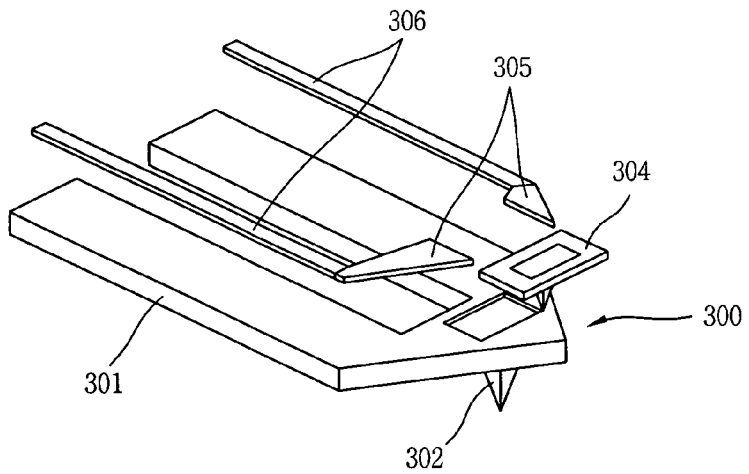
FIGS. 5A to 5C are structural views which illustrate a configuration of the nano data writing and reading apparatus using a cantilever structure in accordance with a first embodiment of the present invention.
Figure 5B:
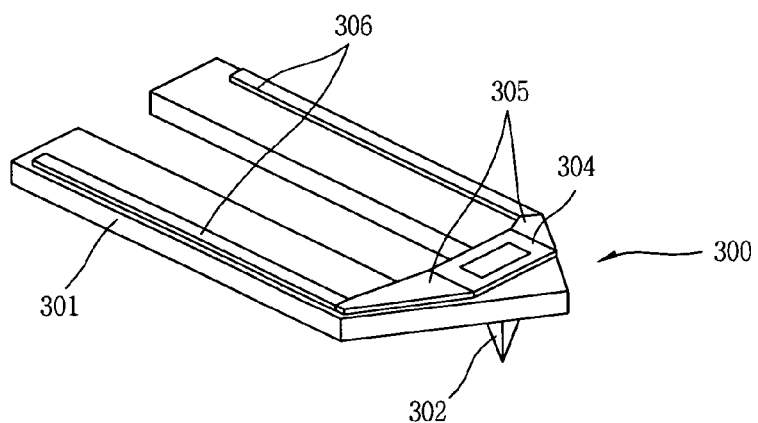
Figure 5C:
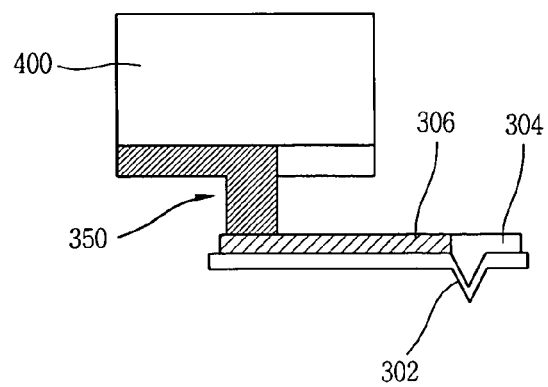

FIGS. 5A to 5C are views which illustrate a structure of a cantilever structure 300 in accordance with the first embodiment of the present invention. FIG. 5A is an exploded perspective view of the cantilever structure, FIG. 5B is an assembled perspective view of the cantilever structure, and FIG. 5C is a sectional view which illustrates that a signal transfer circuit unit 400 for controlling and supporting the cantilever structure is bonded with the cantilever structure 300.

As shown, the nano data writing and reading apparatus using the cantilever structure in accordance with the first embodiment of the present invention includes a cantilever 301 formed by patterning a deposition material deposited on a sacrificial substrate to be etched and removed during a following process, a probe 302 formed at a front end portion of one surface of the cantilever 301 and formed simultaneously with the cantilever 301 such that the deposition material is filled in a probe groove pattern formed on the sacrificial substrate when being deposited on the sacrificial substrate, a data sensing unit formed at the cantilever 301 and sensing data written on media, a signal connection pad 306 connected to the data sensing unit and formed on the cantilever 301 to provide an electrical connection with an exterior signal line, a signal transfer circuit unit 400 connected to the signal connection pad 306 and writing and reading data on and from the media, and a bonding unit 350 allowing the cantilever 30 to be supported at the signal transfer circuit unit 400 and providing an electrical connection passage between the signal connection pad 306 and the signal transfer circuit unit 400.

Namely, the probe is formed by a molding technique using the sacrificial substrate as a mold. Here, one of a silicon nitride material, a silicon oxide material and a metal material is deposited as the deposition material deposited on the sacrificial substrate. Most preferably, the silicon nitride material is deposited to be used as a material of the cantilever and the probe.

Here, the data sensing unit includes a platform 305 formed of the same material as the heater 304 on the cantilever 301, connected to the heater 304 and the probe 302 and reading data through the heater 304. Namely, the heater is required to perform writing on the media, and the platform 305 is a resistor part having resistance and required to read the data. One side of the platform 305 is connected to a side surface of the heater 304 and its other side is connected to the signal connection pad 306.

A signal transfer circuit unit 400 for physically supporting the cantilever structure 300 and controlling the writing and reading operations is physically and electrically connected to the cantilever structure 300 through the bonding unit 350.

The bonding unit includes a first bonding part formed at one of the cantilever and the signal transfer circuit unit and a second boning part formed at the remaining one and coupled to the first bonding part. The more detailed structure of the bonding unit will be described in describing a fabrication method of the nano data writing and reading apparatus using the cantilever structure to be described later.

The important characteristics of the present invention are a material of the cantilever 301 and the probe 302 and a material of the heater 304 and the platform 305. Namely, in the present invention, when the cantilever 301 and the probe 302 are formed, a silicon nitride film, a silicon oxide film or a metal film formed by a chemical vapor deposition method is used in order to obtain the uniformity of a thickness of the cantilever 301 and improve the durability against the abrasion of the probe 302. Also, polycrystalline silicon is used for the heater 304 and the platform 305.

As to a shape of the probe 302 of the present invention, the precision is greatly improved (i.e., a sharp tip can be formed) as compared to the conventional probe formed simply by etching a silicon layer. Thus, the data can be written on the media with a high density.

Figure 6A:
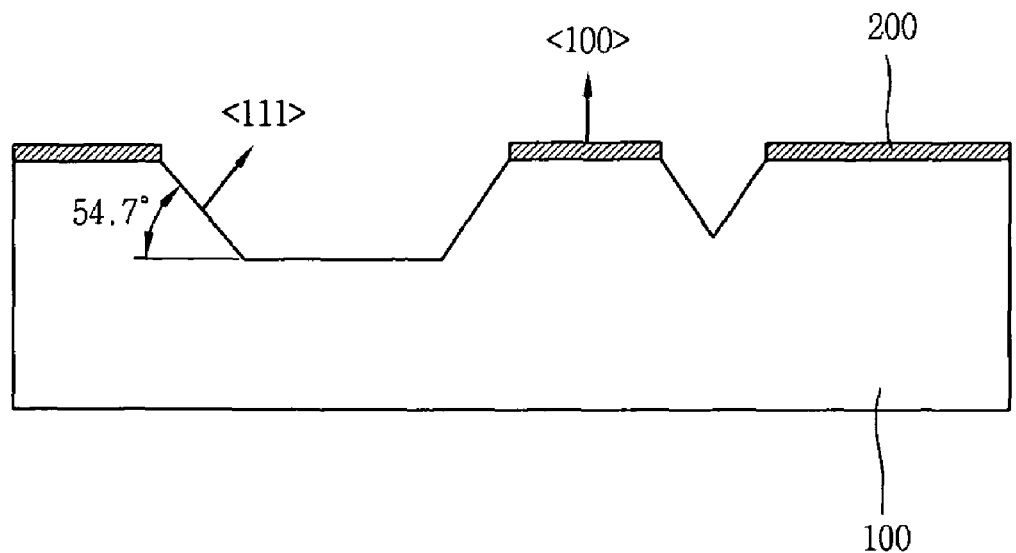
FIGS. 6A and 6B are sectional views of a pattern for fabricating a probe of the nano data writing and reading apparatus using the cantilever structure in accordance with the first embodiment of the present invention.
Figure 6B:
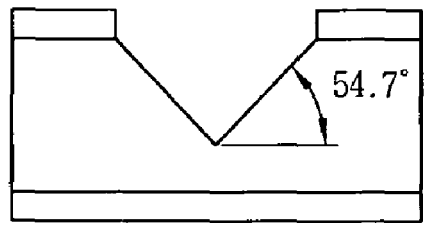

FIGS. 6A and 6B are views for explaining a method for forming a pattern for fabricating the probe in accordance with the present invention. In FIGS3. 6A and 6B, characteristics of the probe proposed by the present invention are shown.

First, in the present invention, in order to make a groove for probe formation on a silicon substrate 100 to be sacrificed, a mask layer 200 is formed and patterned. FIG. 6A is for explaining the characteristics of the groove formed in such a manner. When bulk etching is performed on the silicon substrate 100 of [100] direction by using etching solution (KOH), etching stop occurs at a (111) surface of the silicon. For this reason, as shown in FIG. 6B, a groove of a pyramid structure having a gradient of 54.7° with accuracy is formed.

Because an etching ratio of the (111) surface and the (100) surface of the silicon substrate is 1:300, a groove for the cantilever arrangement may have the uniformity of its height when being made, which becomes an important characteristic of the present invention for the same reason the uniformity of the thickness of the cantilever 301 is important.

Figure 7A:
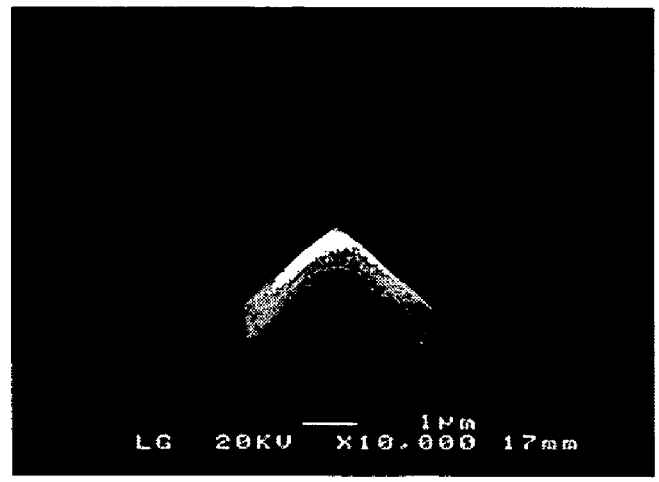
FIGS. 7A and 7B are microscope images which show the probe fabrication result in accordance with the first embodiment of the present invention.

Then, a silicon nitride film is formed on the silicon substrate 100 having such a groove by the chemical vapor deposition method, thereby obtaining a cantilever 301 and a probe 302 structure formed thereon. The probe 302 formed in such a manner is shown in FIG. 7A.

Also, the fabrication of the probe 302 can be performed by the following method in order to form a sharper probe.

Figure 7B:
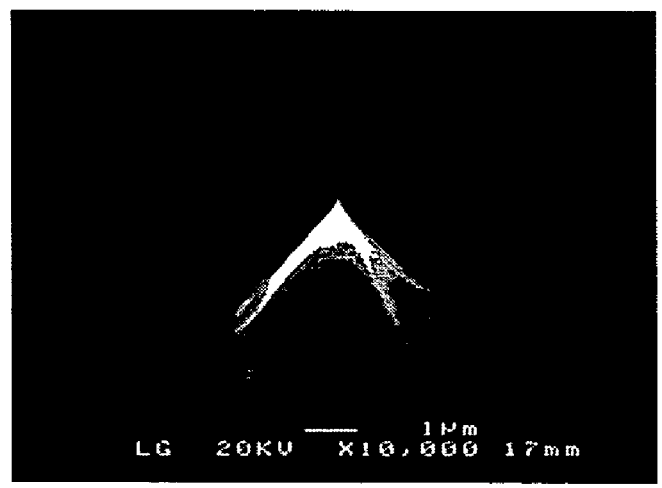

Namely, as the substrate having a groove for the probe formation like the substrate shown in FIG. 6A undergoes thermal oxidation, a silicon oxide film is formed with a thickness of 0.5~1 μm. Here, because the growing rate of the silicon oxide film is high in the [111] direction and is low in the [100] direction, the groove of a pyramid shape has a very sharp form. Thus, the probe 302 formed by depositing a silicon nitride film to the groove where the silicon oxide film is further formed can have a very sharp shape. A micrograph of a probe substantially fabricated in such a manner is shown in FIG. 7B.

In the present invention, a substrate having a cantilever structure can be formed without undergoing a bonding process with a glass wafer which is performed in the conventional art. Namely, unlike the conventional art, a wafer level bonding process may be performed only once during a process for fabricating the nano data writing and reading apparatus using the cantilever structure in accordance with the present invention.

Hereinafter, one example of a method for fabricating the nano data writing and reading apparatus using the cantilever structure in accordance with the first embodiment of the present invention will now be described.

FIGS. 8A to 8I are sectional views which illustrate one example of sequential fabrication processes in accordance with the first embodiment of the present invention. As shown, the method for fabricating the nano data writing and reading apparatus using the cantilever structure in accordance with the present invention includes a separate process for fabricating a cantilever array substrate, a separate process for fabricating a signal transfer circuit unit substrate where a circuit unit for controlling the cantilever array substrate are formed, and a process of bonding the two substrates, which have been separately fabricated by the aforementioned processes through the waver-level bonding, and then removing unnecessary portions.

Such processes are identically applied to fabrication processes in accordance with various embodiments provided thereafter. The order of the separate fabrication processes of the cantilever array substrate and the signal transfer circuit unit substrate provided may be reversed.

Figure 8A:
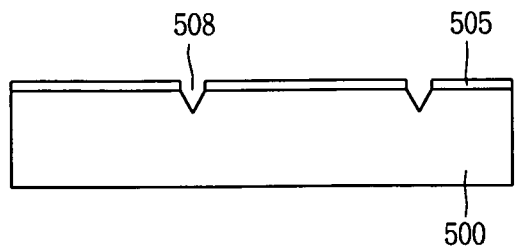
FIGS. 8A to 8I are sectional views which illustrate one example of sequential processes for fabricating the nano data writing and reading apparatus using the cantilever structure in accordance with the first embodiment of the present invention.

First, as shown in FIG. 8A, a mask layer 505 is formed on a principle surface of a silicon substrate 500 to be used as a sacrificial substrate, and then a portion where a probe 302 is to be formed undergoes bulk-etching, thereby forming a probe groove 508 of a pyramid shape. Here, the silicon substrate 500 should be a substrate where a (100) surface is formed in a surface direction.

Figure 8B:
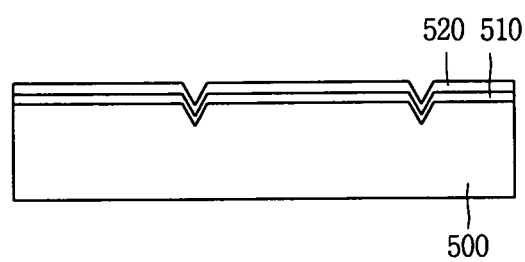

As shown in FIG. 8B, the mask layer 505 is removed, and then the silicon substrate 500 undergoes thermal oxidation, thereby forming a silicon oxide film 510 with a thin thickness. Then, in order to form a cantilever 301 and a probe 302 placed at a front end portion of one surface of the cantilever, a silicon nitride film 520 is formed thereon by a chemical vapor deposition method. Because the silicon oxide film 510 is formed at different growth rates between a portion of the 1o silicon substrate where the probe groove is not formed and the probe groove 508 formed on the silicon substrate 500, a boundary between a corner portion and a lower end portion becomes obvious. Accordingly, the probe 302 formed of the silicon nitride film 520 formed on the silicon oxide film 510 has a sharp exterior.

Here, the silicon oxide film 510 may not be formed but it is very much preferable to form the silicon oxide film 510 before the silicon nitride film 520 is formed, so that the probe 302 can be more sharply formed as described above.

Figure 8C:
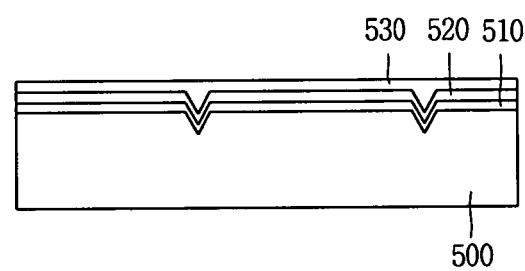

Then, as shown in FIG. 8C, a polycrystalline silicon film 530 for forming a heater at a rear surface of the probe 302 is deposited.

Figure 8D:
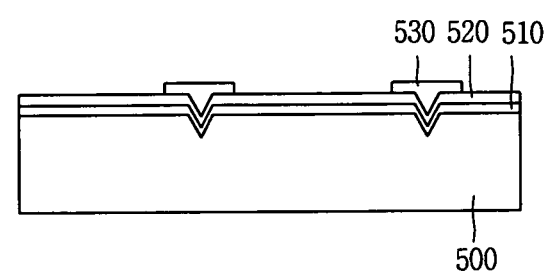

As shown in FIG. 8D, the polycrystalline silicon film 530 is patterned to thereby form a heater 304 and a platform 305.

Figure 8E:
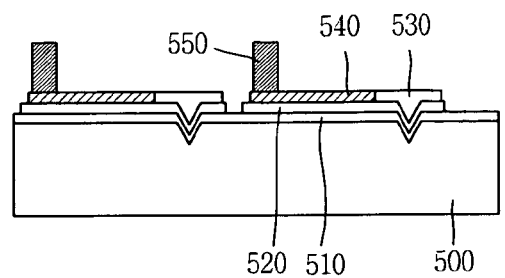

Then, as shown in FIG. 8E, a signal connection pad 540 for transferring a signal to the heater 304 and the platform 305 is formed of a metal thin film, and the silicon nitride film 520 is patterned to form a cantilever 301. Then, a bonding bump 550 protruding from one surface of the cantilever 301 to a certain height is formed so as to electrically connect the signal connection pad 540 to an exterior portion. The bonding bump 550 is formed by using a metal material such as Au—Sn.

Here, a silicon nitride material is taken as an example as a material deposited to form the cantilever and the probe. However, the cantilever and the probe may be formed by depositing a thin film of a silicon oxide material or a metal material as mentioned above.

Through the aforementioned processes, a part for the cantilever array substrate is prepared.

Figure 8F:
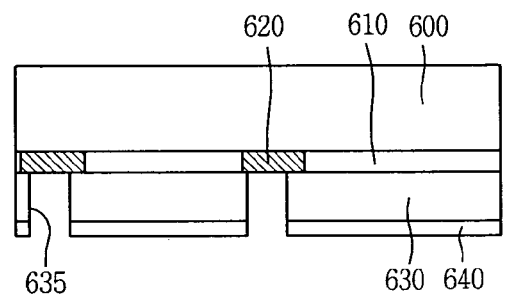

As shown in FIG. 8F, a bonding pad 620 connected to a signal line (not shown) of the signal transfer circuit unit 400 on the substrate 600 on which the signal transfer circuit unit 400 for controlling the cantilever is formed is formed through a separate process. Then, a standard polyimide layer 630 and an adhesive polyimide layer 640 are sequentially formed on an entire surface of the substrate 600 where the signal transfer circuit unit 400 has been formed, and a through hole 635 is formed so as to expose the bonding pad 620. The standard polyimide layer 630 is for maintaining a height for bonding, and the adhesive polyimide 640 melts more easily than the standard polyimide layer to thereby bond the substrate 600 on which the signal transfer circuit unit 400 is formed together with the silicon substrate 500 on which the cantilever array is formed.

Through the aforementioned processes, a part for the signal transfer circuit unit substrate is prepared.

Figure 8G:
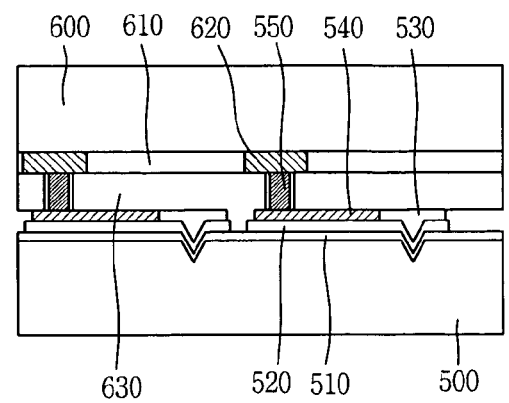

As shown in FIG. 8G, the prepared signal transfer circuit unit substrate 600 and the prepared cantilever array substrate 500 are disposed such that the through hole 635 of the signal transfer circuit unit substrate 600 meshes with the bonding bump 550 of the cantilever array substrate 500. Then, the two substrates are attached together by high temperature and high pressure, thereby performing the wafer-level bonding. Here, the temperature is a temperature at which metal of the bonded portion of the bonding bump 550 melts, and the pressure is 5~6 bar.

Figure 8H:
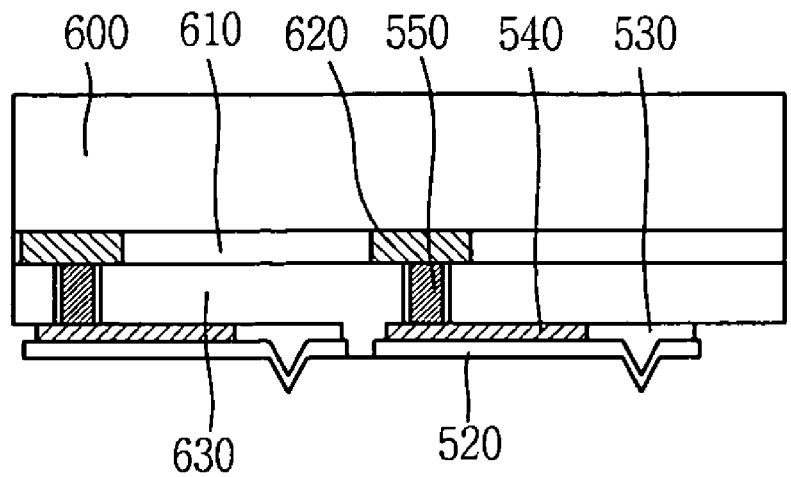

As shown in FIG. 8H, the silicon substrate 500 supporting the cantilever is removed by grinding and dry-etching or wet-etching, and the silicon oxide film 510 is also removed.

Figure 8I:
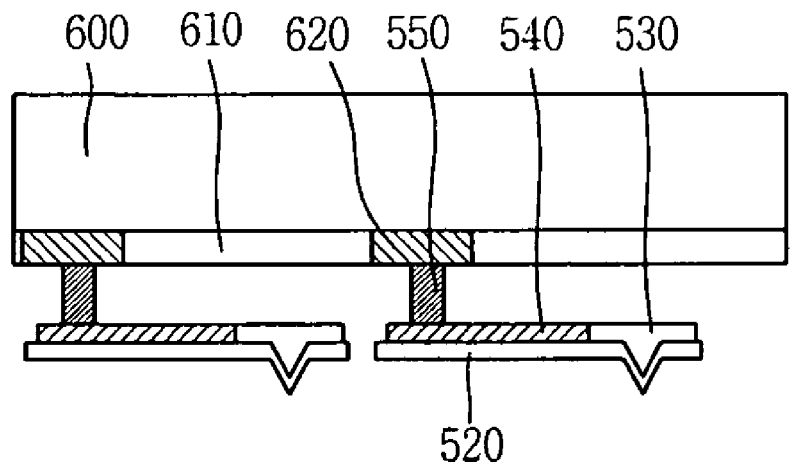
Figure 9A:
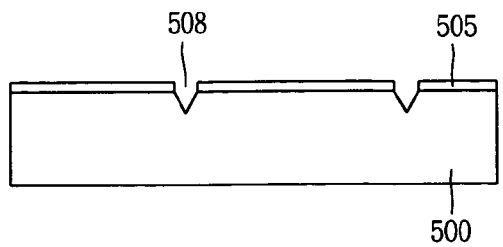
FIGS. 9A to 9I are sectional views which illustrate another example of sequential processes for fabricating the nano data writing and reading apparatus using the cantilever structure in accordance with a first embodiment of the present invention.
Figure 9B:
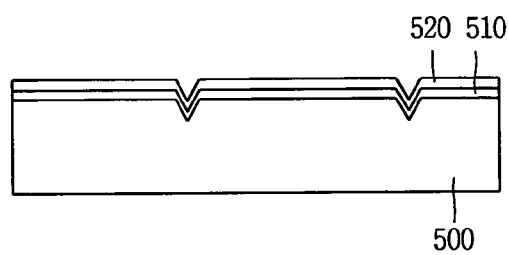
Figure 9C:
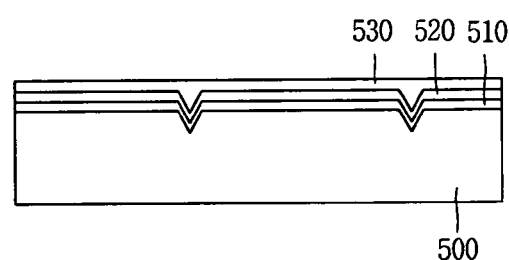
Figure 9D:
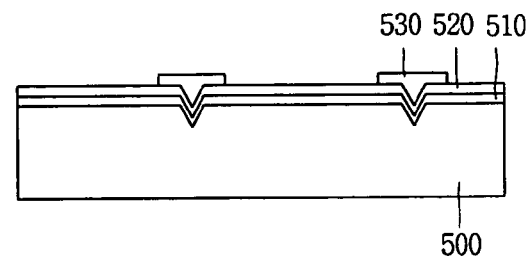
Figure 9E:
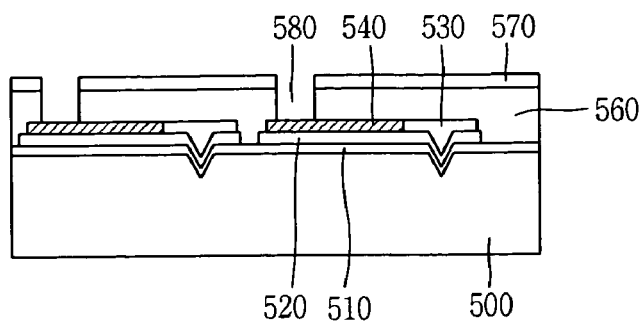
Figure 9F:
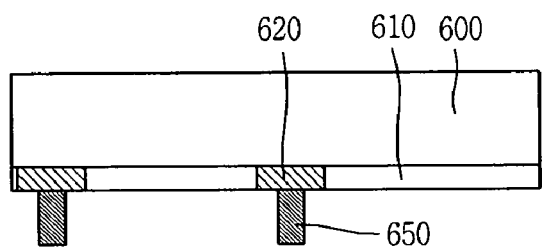
Figure 9G:
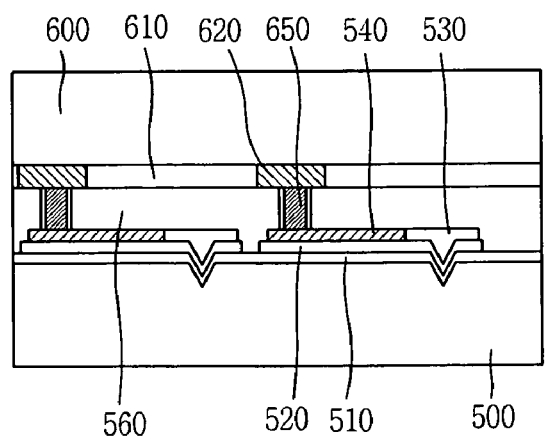
Figure 9H:
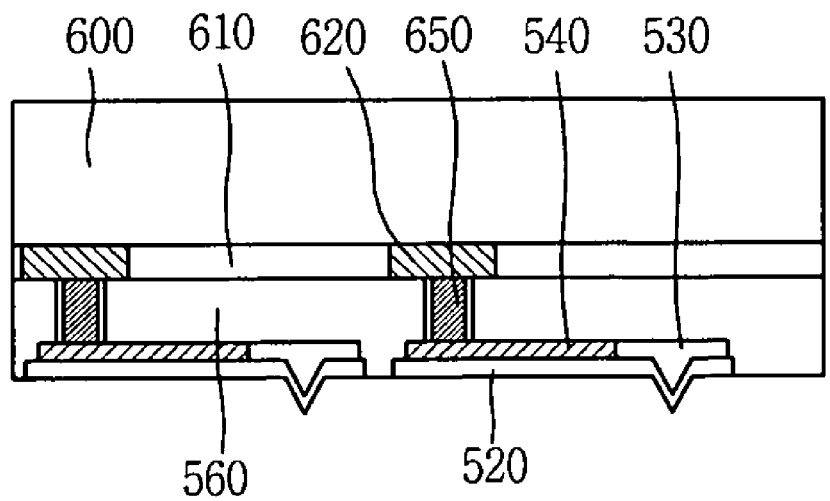
Figure 9I:
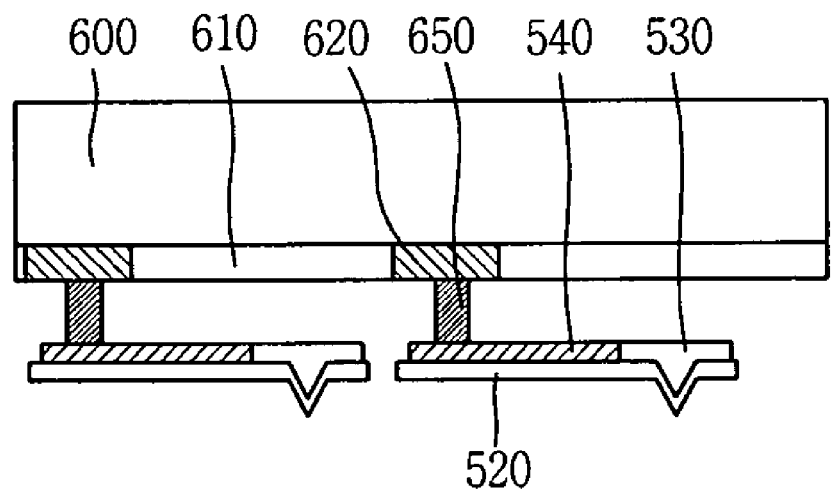

As shown in FIG. 8I, the standard polyimide layer 630 and the adhesive polyimide layer 640 on the signal transfer circuit unit substrate are removed, so that the cantilever 301 is supported at the signal transfer circuit unit 400 and suspended.

The nano data writing and reading apparatus using the cantilever in accordance with the first embodiment of the present invention can be formed through the aforedescribed processes. Also, such a nano data writing and reading apparatus can write and read the data by the thermo-mechanical method. In the present invention, it is seen through the processes that only one wafer-level bonding process is required, which means that the fabrication method in accordance with the present invention has a high process yield and requires a low cost as compared to the conventional fabrication method.

FIGS. 9A to 9I are sectional views which show another example of sequential processes for fabricating the nano data writing and reading apparatus using the cantilever structure in accordance with the first embodiment of the present invention. The processes are performed in the similar manner to those of the fabrication method described through FIGS. 8A to 8I. The difference therebetween is that polyimide layers 560 and 570 and a through hole 580 are formed on the cantilever array substrate and a bonding bump 650 meshing therewith is formed on a bonding pad 620 formed on the signal transfer circuit unit substrate.

Namely, after the standard polyimide layer 560 and the polyimide layer 570 for adhesion are sequentially formed on the substrate 500 provided with the cantilever, the through hole 580 is formed so that part of the signal connection pad 540 is exposed for a connection with an exterior part. Also, the bonding pad 620 connected to a circuit unit signal line on the signal transfer circuit unit substrate 600 is formed, and a bump 650 is protrudingly formed on the bonding pad 620 to a certain height and is electrically connected to an exterior portion. Then, the two substrates are bonded together, and the exposed signal connection pad 540 is coupled with the bump 650, thereby forming the bonding unit 350.

Namely, the cantilever array substrate 500 and the signal transfer circuit unit substrate 600 are bonded through the bonding unit 350, and the bonding unit 350 is formed such that a first bonding structure formed on one of the cantilever array substrate 500 and the signal transfer circuit unit substrate 600 is coupled to a second bonding structure formed on the remaining substrate.

The substrate where bonding structures are formed during a specific fabrication process is not limited but may be flexibly adjusted corresponding to a process state or a fabrication environment, so that a process design can be freely made.

Such characteristics of the present invention in the aspect of the structure and the fabrication method can be applied to a cantilever employing a thermo-piezoelectric method.

The thermo-piezoelectric method uses the thermo-mechanical method only to write data and uses a piezoelectric sensor to read the data. In such a method, a ZnO or PZT thin film is integrated with a cantilever in a capacitor type, and the data is read by measuring vibration generated at the time of reading.

Figure 10A:
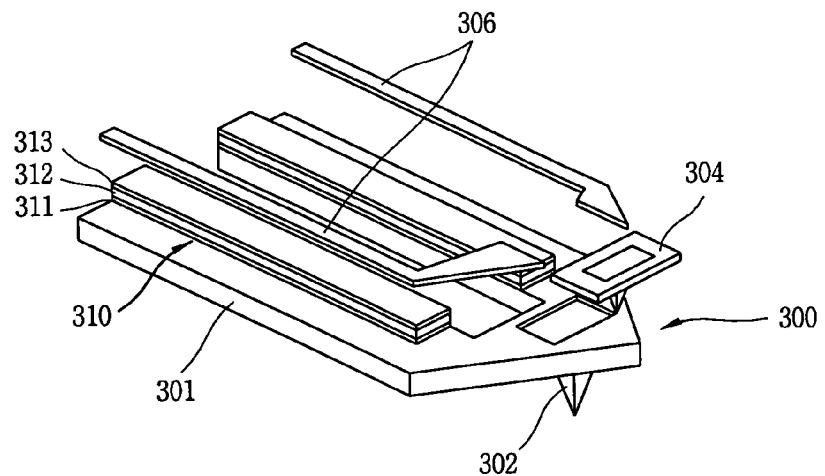
FIGS. 10A to 10C are structural views which illustrate a configuration of the nano data writing and reading apparatus using the cantilever structure in accordance with the second embodiment of the present invention.
Figure 10B:
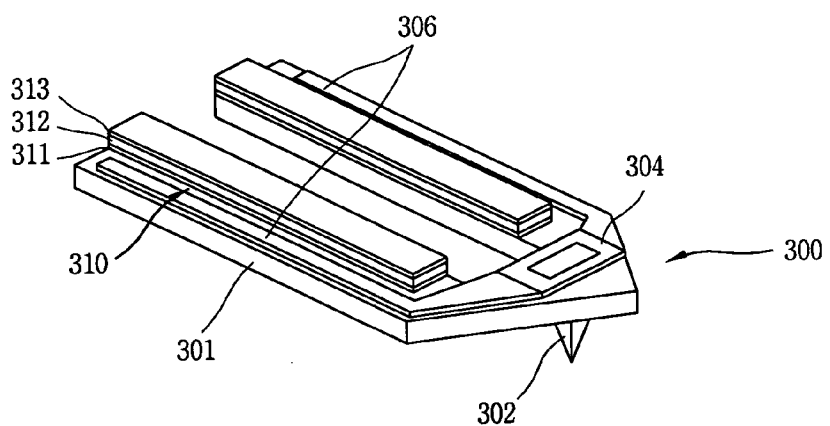
Figure 10C:
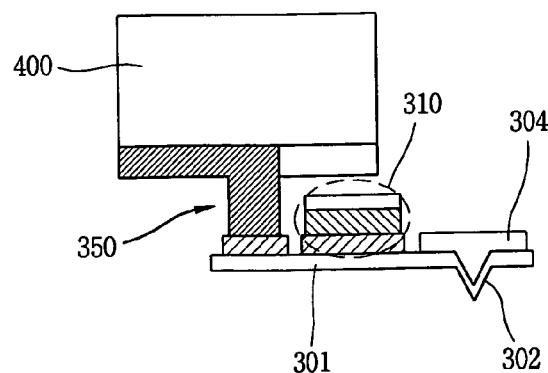

FIGS. 10A to 10C are conceptual views which illustrate a structure of the nano data writing and reading apparatus using the cantilever in accordance with the second embodiment of the present invention and its operation method. As shown, in order to read the data written on a PMMA media, the nano data writing and reading apparatus further having the piezoelectric sensor disposed at a cantilever structure provided with a heater is used. The writing of the data is made by forming a groove by heating the heater like the cantilever using the conventional thermo-mechanical method.

The structure of the nano writing and reading apparatus using the cantilever in accordance with the second embodiment of the present invention will now be described in detail. Here, the same reference numerals are given to the same structures as those of the first embodiment.

As shown, the nano data writing and reading apparatus using the cantilever in accordance with the second embodiment of the present invention includes a cantilever 301 formed of a silicon nitride material, a probe 302 formed of the same material as that of the cantilever body 301, a heater 304 formed of polycrystalline silicon on a cantilever body where the probe 302 is formed, a piezoelectric sensor 310 disposed in a longitudinal direction of the cantilever body, a signal connection pad 306 connected to the heater 304 and providing an electrical connection with an external signal line, a signal transfer circuit unit 400 separately formed, for controlling data writing and reading performed through the cantilever structure, and a bonding unit 350 allowing the cantilever 301 to be supported at the signal transfer circuit unit 400 and providing an electrical passage between the signal connection pad 306 and the signal transfer circuit unit 400.

Namely, a data sensing unit for sensing data stored on the media includes the piezoelectric sensor 310, not a platform formed of polycrystalline silicon, which is proposed in the first embodiment.

In the second embodiment, the cantilever body 301 and the probe 302 are also formed of a silicon nitride film formed by the chemical vapor deposition method, thereby improving the uniformity of a thickness and the durability against abrasion. Also, the probe 302 may be formed by using the silicon substrate to be sacrificed and the silicon oxide film as a mold, so that the probe 302 can have a sharp shape.

The piezoelectric sensor 310 is a capacitor type sensor with a piezoelectric material 312 such as PZT, ZnO or the like placed between a lower substrate 311 formed of Ti/Pt and an upper substrate 313 using $RuO_2$.

Figure 11:
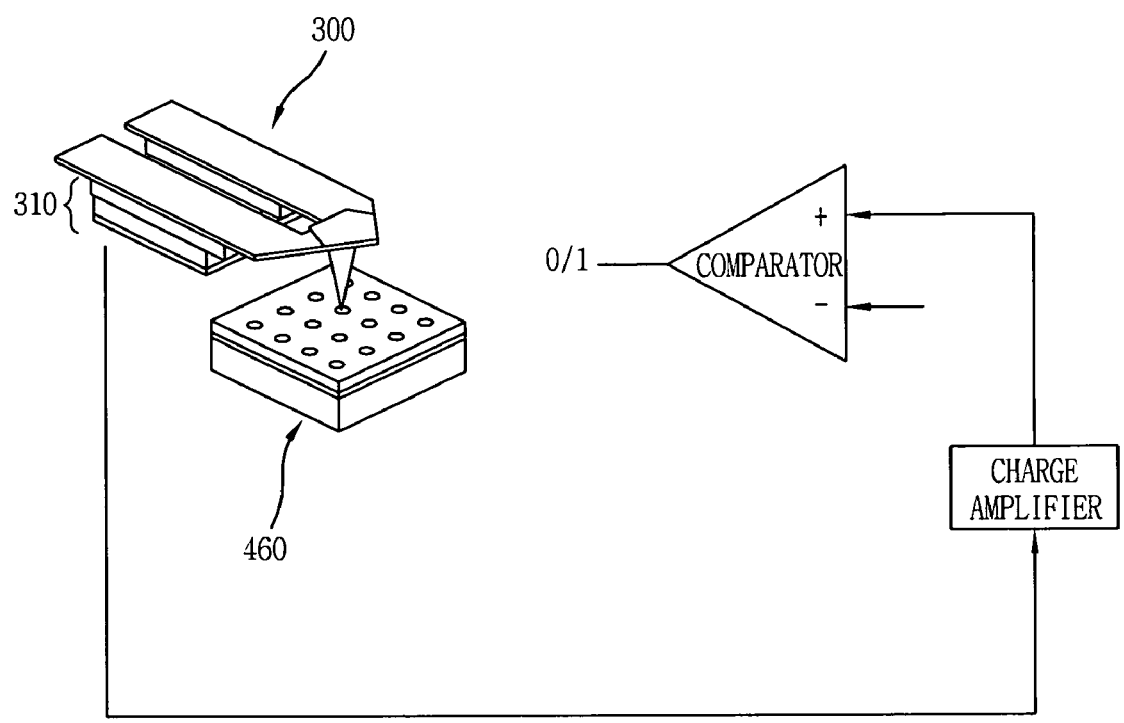
FIG. 11 is a conceptual view which illustrate a reading method of the nano data writing and reading apparatus having a cantilever structure in which a piezoelectric sensor is used as a data sensing unit.

FIG. 11 is a conceptual view which illustrates a reading method of the nano data writing and reading apparatus having the cantilever structure using the piezoelectric sensor as the data sensing unit.

As for the method for reading the data from a groove formed on the media, as shown in FIG. 11, when the cantilever 300 moves over the media 460 having grooves, that is, scans the media the probe of the cantilever is inserted in the groove formed on the media. Here, stress of the cantilever itself is changed, and such a change is recognized by the integrated piezoelectric sensor 310. By such a stress change of the cantilever, the stress of the piezoelectric material included in the piezoelectric sensor 310 is changed, and a small electric charge thusly occurs. The induced electric charge is converted into a voltage by an electric charge amplifier, and the data of 0 and 1 is outputted through a comparator.

Reading the data by using the piezoelectric sensor has several crucial advantages.

The first advantage is that, because a signal is automatically generated due to a change in the cantilever stress at the time of data reading, power consumption does not occur during the reading, which works as a great merit when the data reading method using the piezoelectric sensor is applied to portable devices.

The second advantage is flexibility in selecting media. When both writing and reading are performed by the thermo-mechanical method, an appropriate temperature should be maintained so as to secure appropriate sensitivity for the reading, which means that the use of media vulnerable to a high temperature is restricted. Thus, if there is no need to rise a temperature in order to read the data as in the thermo-piezoelectric method, the media can be selected freely.

The third advantage of reading the data using the piezoelectric sensor is that a structure for reading is simple and measurement precision is improved because a variation between cantilevers, namely, offset does not occur. When the data should be read by basically using a resistor part (i.e., platform) such as a resistance change using heat, a resistance change through pressure or the like, the resistor part should be very delicately produced, which is difficult. However, because every cantilever has a slightly different resistor part in general, in order to overcome the output voltage offset due to such resistance differences, a method of integrating an identical part in a place adjacent to the resistor part and using the integrated resistance as reference resistance or a method of removing a DC offset voltage by using a high frequency through filter should be used. The former method has problems in that two cantilevers are integrated in one region and the latter one has problems in that a large capacitor should be integrated. Also, in a temperature sensing method, a surrounding temperature may cause offset, which may work as a fatal flaw when it is put to practical use.

Lastly, because an electric charge related to a data-reading rate is generated at a rate of merely about several ns when the piezoelectric sensor is used, a high reading rate can be implemented as compared to the heat-mechanical method which requires a time of about several us to rise a temperature at the time of data reading.

Figure 12A:
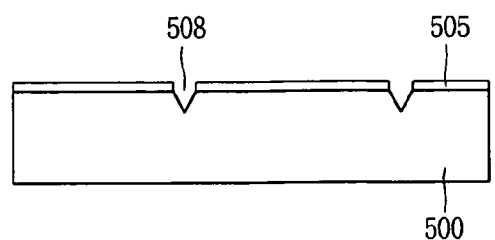
FIGS. 12A to 12I are sectional views which illustrate one example of sequential processes for fabricating the nano data writing and reading apparatus using the cantilever structure in accordance with the second embodiment of the present invention.
Figure 12B:
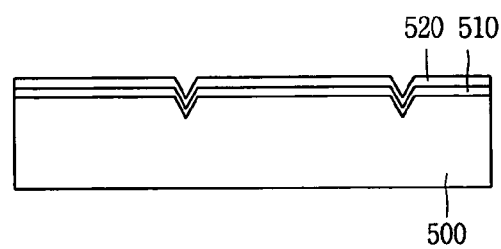
Figure 12C:
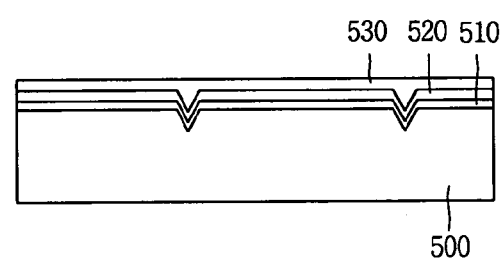
Figure 12D:
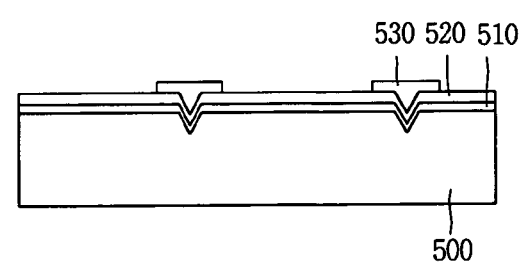
Figure 12E:
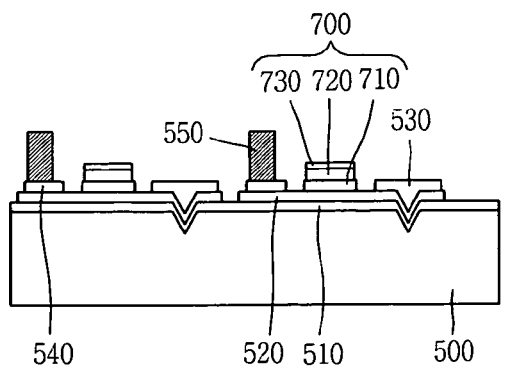
Figure 12F:
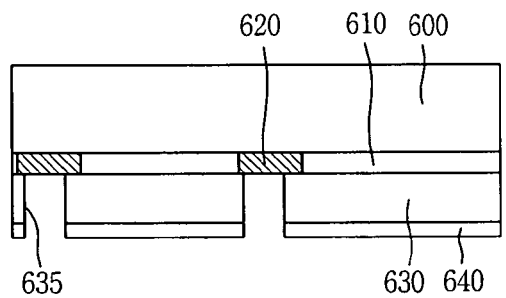
Figure 12G:
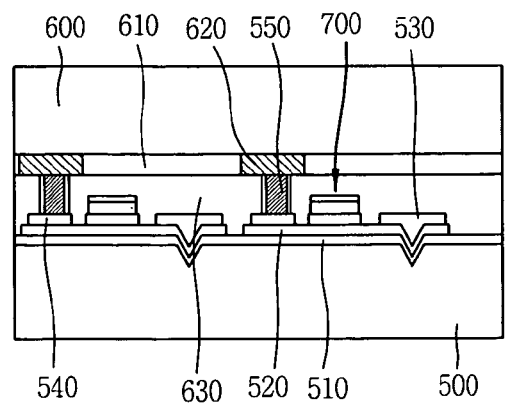
Figure 12H:
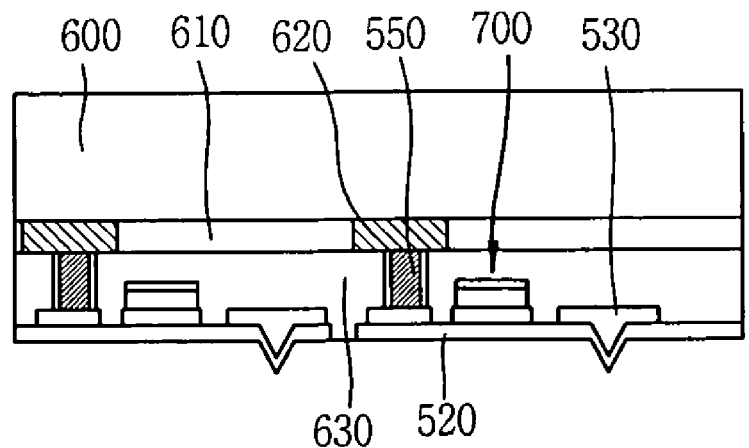
Figure 12I:
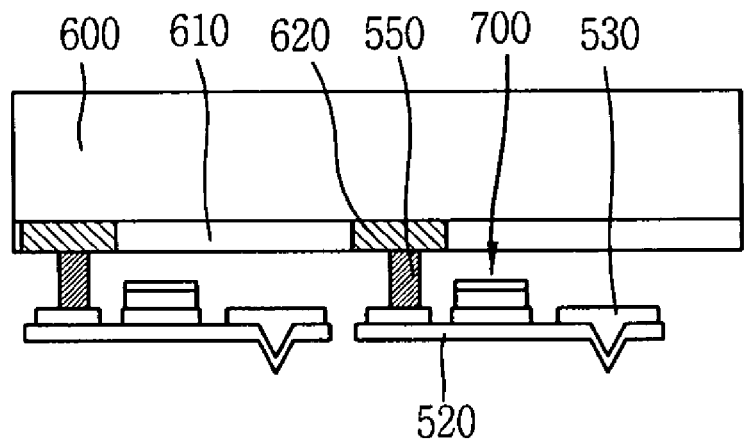
Figure 13A:
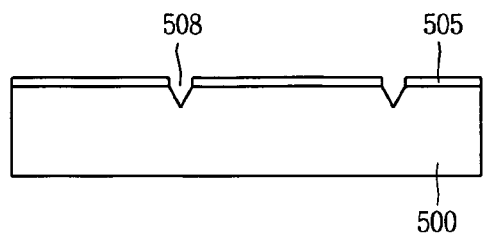
FIGS. 13A to 13I are sectional views which illustrate another example of sequential processes for fabricating the nano data writing and reading apparatus using the cantilever structure in accordance with the second embodiment of the present invention.
Figure 13B:
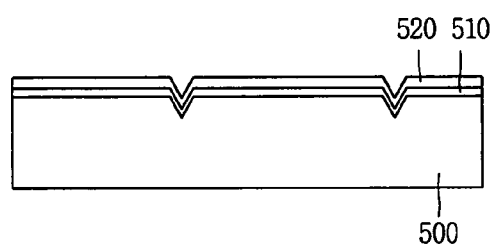
Figure 13C:
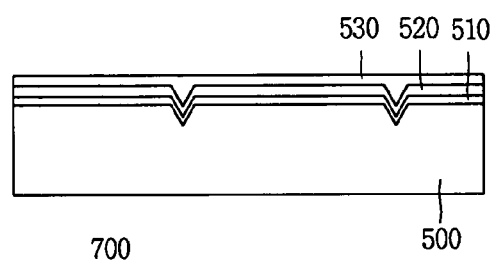
Figure 13D:
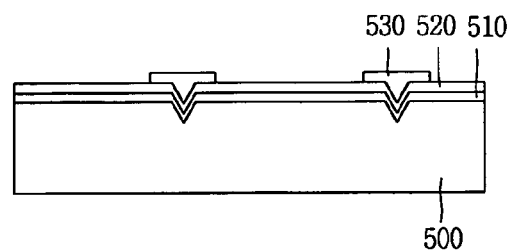
Figure 13E:
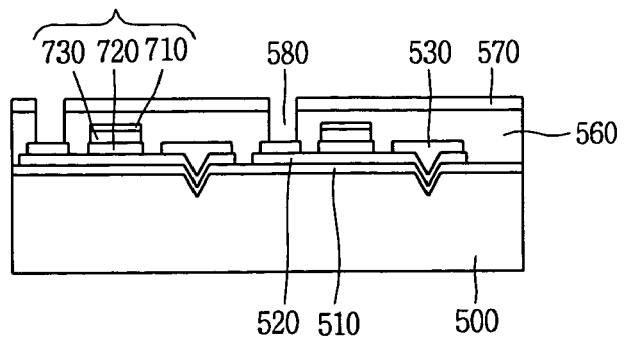
Figure 13F:
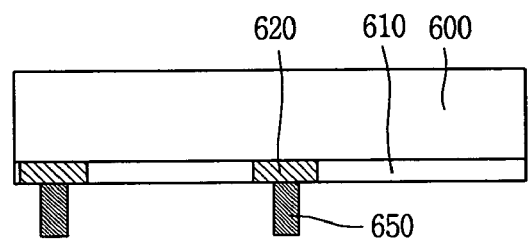
Figure 13G:
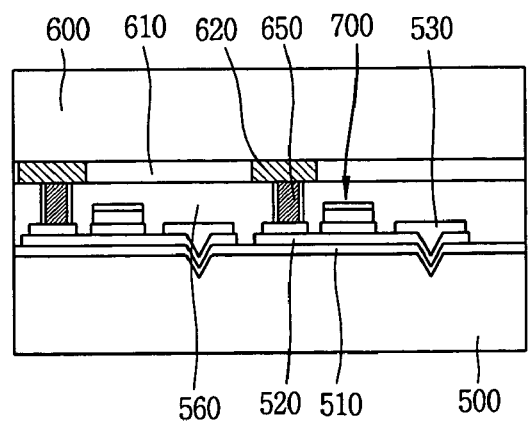
Figure 13H:
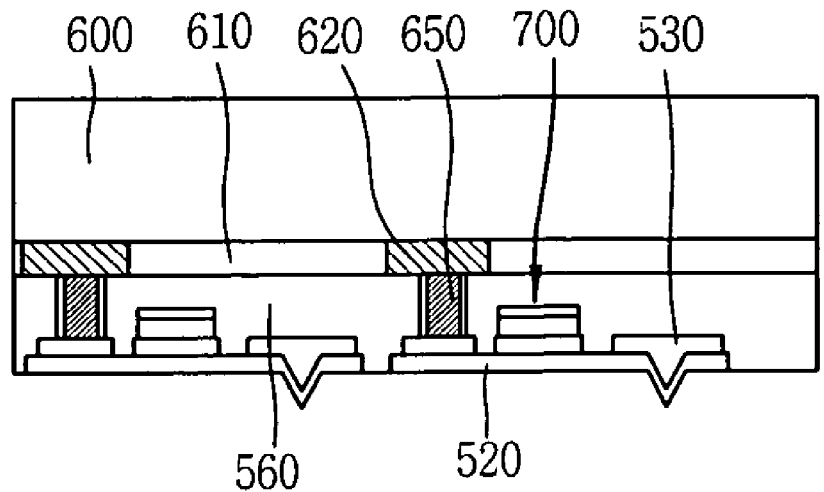
Figure 13I:
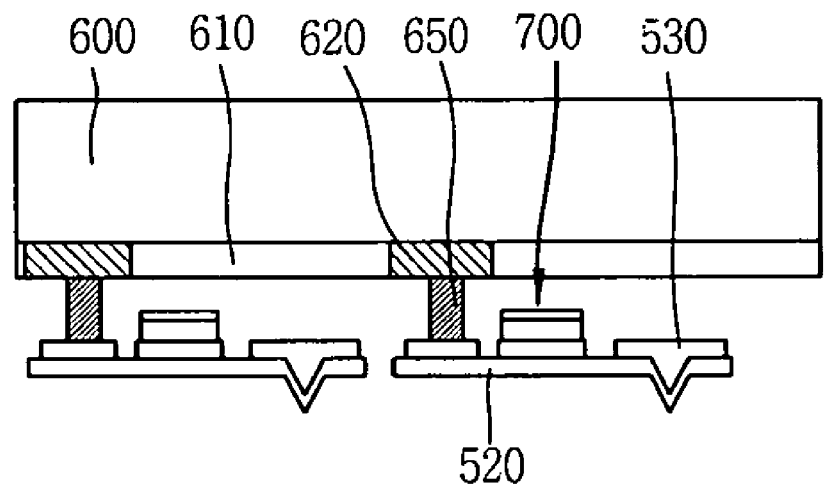

FIGS. 12A to 12I are sectional views which illustrate one example of sequential processes of fabricating the nano data writing and reading apparatus using the cantilever structure in accordance with the second embodiment. Most of the processes are the same as those of the fabrication method in accordance with the first embodiment of the present invention described referring to FIGS. 8A to 8I. The only difference therebetween is that a process of forming a piezoelectric sensor, which can measure the bending of the cantilever, on a silicon nitride film from which a cantilever 301 is to be formed is added as shown in FIG. 12E instead of the process forming a platform as the data sensing unit. Therefore, the description on the detailed fabrication processes will be omitted.

FIGS. 13A to 13I are sectional views which illustrate another example of sequential processes of fabricating the nano data writing and reading apparatus using the cantilever structure in accordance with the second embodiment of the present invention, and such processes are performed in the similar manner to those illustrated in the sectional views of FIGS. 12A to 12I. The only difference therebetween is that the polyimide layers 560 and 570 and the through hole 580 are formed on the cantilever array substrate, and the bonding bump 650 meshing therewith is formed on the bonding pad 620 formed on the signal transfer circuit unit substrate.

Also, FIGS. 14A to 14D illustrate another example of a bonding process between the cantilever structure substrate and the signal transfer circuit unit substrate in the process of fabricating the nano data writing and reading apparatus using the cantilever structure in accordance with the second embodiment of the present invention. Such a bonding process may be applied to every embodiment of the fabrication process in accordance with the present invention. If this bonding process is used, a separate process of removing a polyimide layer is not required.

Figure 14A:
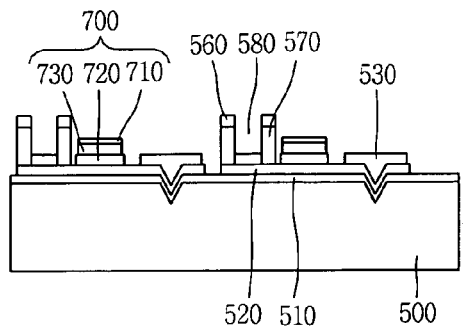
FIGS. 14A to 14D are views which illustrate another example of a bonding process of a cantilever structure substrate and a signal transfer circuit unit substrate in the process for fabricating the nano data writing and reading apparatus using the cantilever structure in accordance with the second embodiment of the present invention.
Figure 14B:
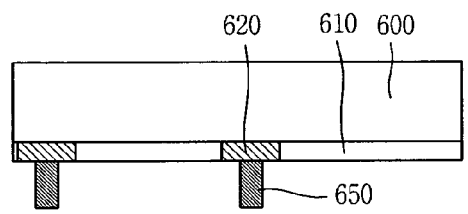
Figure 14C:
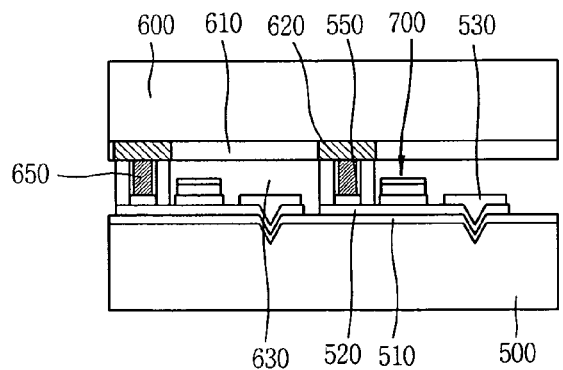
Figure 14D:
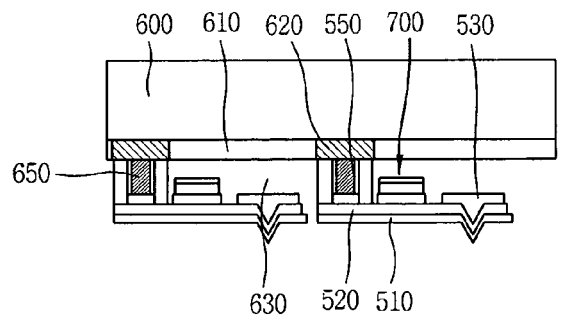

Namely, the polyimide layers 560 and 570 and the through hole 580 for bonding are formed on the cantilever array substrate 500 as shown in FIG. 14A, and the bonding bump 650 for signal connection and physical support is formed on the signal transfer circuit unit substrate 600. Here, as in the aforementioned fabrication method, before the bonding process between the two substrates is performed, the polyimide layers 560 and 570 excluding their portions surrounding the through hole 580 undergoes etching and removing. Thus, a separate process for etching and removing the polyimide layer is not required, so that the process is facilitated and the physical support strength of the bonding unit is also improved.

Here, states of bonding layers and a substrate where bonding structures are formed are not limited but may be flexibly controlled corresponding to a process state and a fabrication environment, which allows the process to be freely designed.

As described so far, in the nano data writing and reading apparatus using the cantilever structure and its fabrication method in accordance with the present invention, a groove having a probe shape is formed on a silicon substrate by etching, a silicon nitride film of a uniform thickness is deposited thereon, and a cantilever and a probe are simultaneously formed by using the silicon nitride film. Accordingly, the uniform thickness of the cantilever and the uniform height of the probe can be obtained. Also, as the probe is formed of a silicon nitride material, its durability is greatly improved.

Also, a heater and a platform are formed of polycrystalline silicon, and a cantilever array substrate is formed without a bonding process with a glass substrate, which contributes to reducing a wafer-level bonding process requiring precision in the entire process. Accordingly, the process can be facilitated and thus a fabrication cost is thusly reduced.

Also, because the aforementioned characteristics in the aspect of both the structure and the fabrication method are still applied to the case where a cantilever structure performing writing using heat and performing reading using a piezoelectric sensor is produced, the uniformity of the thickness of the cantilever and the durability of the probe are improved, efficiency of the fabrication process is improved, and the fabrication cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A nano data writing and reading apparatus using a cantilever structure, the apparatus comprising:

a cantilever formed by patterning a deposition material deposited on a sacrificial substrate;

a probe formed at a front end portion of one surface of the cantilever and formed simultaneously with the cantilever as the deposition material is filled in a probe groove pattern formed on the sacrificial substrate when the deposition material is deposited on the sacrificial substrate;

a heater formed of polycrystalline silicon at the cantilever, for heating the probe;

a data sensing unit formed at the cantilever and sensing data written on media;

a signal connection pad connected to the data sensing unit and formed at the cantilever to provide an electrical connection with an external signal line;

a signal transfer circuit unit connected to the signal connection pad, for controlling writing and reading of data on and from the media; and a bonding unit allowing the cantilever to be supported at the signal transfer circuit unit and providing a passage for an electrical connection between the signal connection pad and the signal transfer circuit unit.

2. The apparatus of claim 1, wherein the deposition material is one of a silicon nitride, a silicon oxide and a metal.

3. The apparatus of claim 1, wherein the probe has a pyramid shape and each side wall is inclined at an angle of 54.7° from a horizontal surface.

4. The apparatus of claim 1, wherein the bonding unit comprises:
a first bonding part formed at one of the cantilever and the signal transfer circuit unit; and
a second bonding part formed at the remaining one and coupled to the first bonding part.

5. The apparatus of claim 4, wherein the first bonding part is a signal connection pad formed at the cantilever, and the second bonding part is a bump protrudingly formed at the signal transfer circuit unit to a certain height.

6. The apparatus of claim 4, wherein the first bonding part is a bump formed from one surface of the cantilever to a certain height and electrically connected to the signal connection pad of the cantilever, and the second bonding part is a pad formed at the signal transfer circuit unit.

7. The apparatus of claim 1, wherein the data sensing unit is a platform formed, at the cantilever, of the same material as the heater and connected to the heater and the probe.

8. The apparatus of claim 7, wherein one side of the platform is connected to a side surface of the heater and its other side is connected to the signal connection pad.

9. The apparatus of claim 1, wherein the data sensing unit is a piezoelectric sensor.

10. The apparatus of claim 9, wherein the piezoelectric sensor is formed at one surface of the cantilever in its longitudinal direction.

11. The apparatus of claim 9, wherein the piezoelectric sensor is a capacitor type sensor with a piezoelectric material disposed between a lower electrode and an upper electrode.

12. The apparatus of claim 11, wherein the piezoelectric material is a PZT thin film or a ZnO thin film.

13. The apparatus of claim of 9, wherein the lower electrode is Ti-Pt, and the upper electrode $RuO_2$.

14. A nano data writing and reading apparatus using a cantilever structure, the apparatus comprising:
a cantilever formed by patterning a deposition material deposited on a sacrificial substrate;
a probe formed at a front end portion of one surface of the cantilever and formed simultaneously with the cantilever as the deposition material is filled in a probe groove pattern formed on the sacrificial substrate when the deposition material is deposited on the sacrificial substrate;
a heater formed of polycrystalline silicon at the cantilever, for heating the probe;
a platform formed at the cantilever, connected to the heater and the probe, formed of the same material as the heater, and sensing data written on media;
a signal connection pad connected to the platform and formed at the cantilever to provide an electrical connection with an external signal line;
a signal transfer circuit unit connected to the signal connection pad, for controlling writing and reading of data on and from the media; and
a bonding unit allowing the cantilever to be supported at the signal transfer circuit unit and providing a passage for an electrical connection between the signal connection pad and the signal transfer circuit unit.

15. The apparatus of claim 14, wherein the deposition material is one of a silicon nitride, a silicon oxide and a metal.

16. The apparatus of claim 14, wherein the bonding unit comprises:
a first bonding part provided at one of the cantilever and the signal transfer circuit unit; and
a second bonding part provided at the remaining one and coupled to the first bonding part.

17. The apparatus of claim 14, wherein one side of the platform is connected to a side surface of the heater, and its other side is connected to the signal connection pad.

18. A nano data writing and reading apparatus using a cantilever structure, the apparatus comprising:
a cantilever formed by patterning a deposition material deposited on a sacrificial substrate;
a probe formed at a front end portion of one surface of the cantilever and formed simultaneously with the cantilever as the deposition material is filled in a probe groove pattern formed on the sacrificial substrate when the deposition material is deposited on the sacrificial substrate;
a heater formed of polycrystalline silicon at the cantilever, for heating the probe;
a piezoelectric sensor formed at the cantilever and sensing data written on media;
a signal connection pad connected to the piezoelectric sensor and formed at the cantilever to provide an electrical connection with an external signal line;
a signal transfer circuit unit connected to the signal connection pad, for controlling writing and reading of data on and from the media; and
a bonding unit allowing the cantilever to be supported at the signal transfer circuit unit and providing a passage for an electrical connection between the signal connection pad and the signal transfer circuit unit.

19. The apparatus of claim 18, wherein the deposition material is one of a silicon nitride material, a silicon oxide material and a metal material.

20. The apparatus of claim 18, wherein the piezoelectric sensor is formed at one surface of the cantilever in its longitudinal direction.

21. The apparatus of claim 18, wherein the piezoelectric sensor is a capacitor type sensor with a piezoelectric material disposed between a lower electrode and an upper electrode.

22. The apparatus of claim 21, wherein the piezoelectric material is a PZT thin film or a ZnO thin film.

23. The apparatus of claim 21, wherein the lower electrode is Ti-Pt, and the upper electrode is $RuO_2$.

24. A fabrication method of a nano data writing and reading apparatus using a cantilever structure, the method comprising:

a first step of forming a probe groove at a principle surface of a silicon substrate;

a second step of forming a silicon nitride film at the principle surface of the silicon substrate, for forming a cantilever and a probe;

a third step of forming a heater at a rear surface of the probe, patterning the cantilever on the silicon nitride film, and forming a signal connection pad electrically connected to the heater on the cantilever and a data sensing unit connected to the signal connection pad and sensing data;

a fourth step of bonding a substrate provided with the signal transfer circuit unit with the silicon substrate provided with the cantilever, for supporting the cantilever and electrically connecting the signal transfer circuit unit with the signal connection pad; and a fifth step of removing the silicon substrate, for exposing the cantilever and the probe.

25. The method of claim 24, wherein the first step comprises:

forming a silicon nitride film at the principle surface of the silicon substrate and exposing one portion of the principle surface of the silicon substrate to form the probe groove; and forming a probe by wet-etching the silicon substrate through the principle surface of the exposed silicon substrate.

26. The method of claim 24, wherein, in the second step, a silicon oxide film is further formed at the principle surface of the silicon substrate before the silicon nitride is formed, and in the fifth step, the silicon oxide film is removed together with the silicon substrate.

27. The method of claim 26, wherein the silicon oxide film is formed by a thermal oxidation method.

28. The method of claim 24, wherein the heater is formed of a polycrystalline silicon material.

29. The method of claim 24, wherein the data sensing unit is a platform formed to be connected to both side surfaces of the heater and the signal connection pad when the heater is formed.

30. The method of claim 29, wherein the platform is made of the same material as the heater.

31. The method of claim 24, wherein the data sensing unit is a piezoelectric capacitor formed on the signal connection pad.

32. The method of claim 24, wherein the fourth step comprises:

forming a first bonding structure protruding from one surface of the cantilever to a certain height in order to electrically connect the signal connection pad formed at the cantilever with an exterior portion; and forming a second bonding structure coupled to the first bonding structure when the two substrates are bonded together.

33. The method of claim 32, wherein the step of forming the second bonding structure comprises:

forming a bonding pad connected to a signal line of the signal transfer circuit unit and forming a polyimide layer on its entire upper surface; and forming a through hole at the polyimide layer so as to expose the bonding pad.

34. The method of claim 33, wherein, after the first step, the polyimide layer is removed so that the cantilever can be supported at the signal transfer circuit unit substrate and be thusly suspended.

35. The method of claim 24, wherein the fourth step comprises:

forming a polyimide layer on the substrate provided with the cantilever and then forming a through hole at the polyimide layer in order to expose part of the signal connection pad for a connection with an exterior portion;

forming a bonding pad connected to a circuit unit signal line on the signal transfer circuit unit substrate;

forming a bump protrudingly formed on the bonding pad to a certain height to be electrically connected to an exterior portion; and bonding the two substrates together and coupling the bump with the exposed signal connection pad.

36. The method of claim 35, wherein, after the fifth step, the polyimide layer is removed so that the cantilever can be supported at the signal transfer circuit unit substrate and be thusly suspended.

37. The method of claim 33, the step of forming the through hole by etching the polyimide layer further comprises:

etching and removing the polyimide layer excluding their portions surrounding the through hole when the through hole is formed.

* * * * *